A. M. NEWELL.
MEAT AND BONE CUTTING MACHINE.
APPLICATION FILED MAY 1, 1912.
1,168,822.
Patented Jan. 18, 1916.
7 SHEETS—SHEET 1.
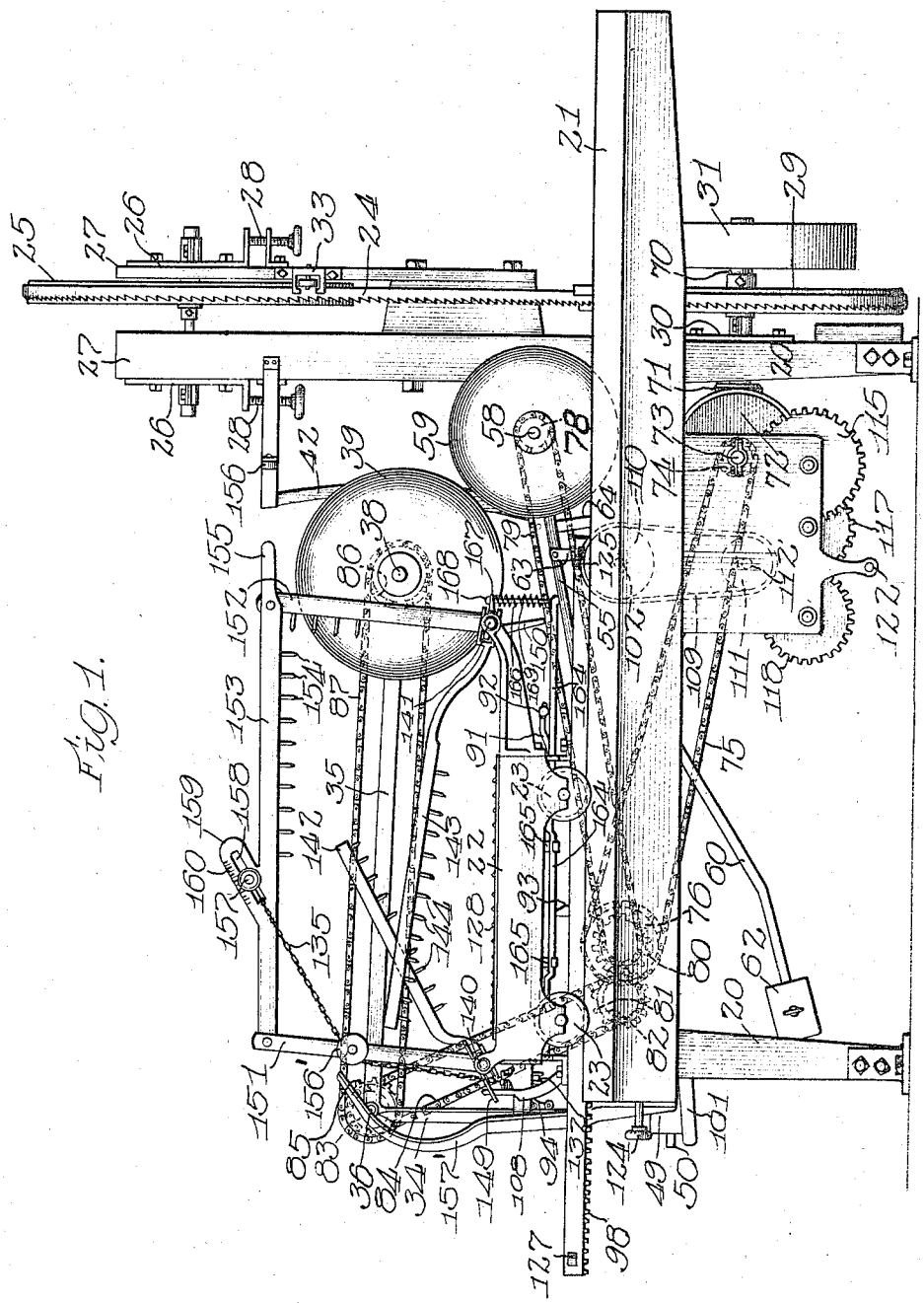
Witnesses:
G. W. Domarus Jr.
W. T. Kilroy
Inventor:
Atwood M. Newell
By: Brown & Hopkins
Attys

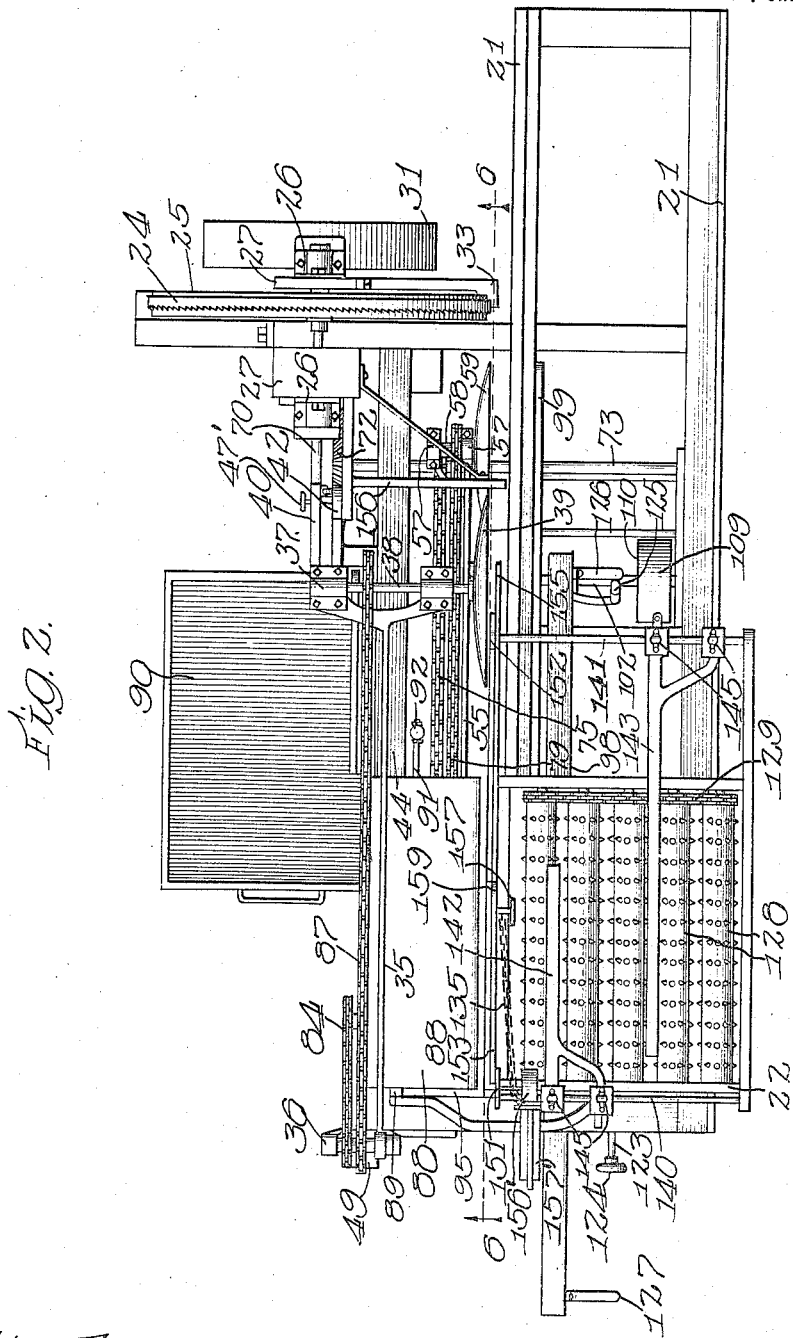

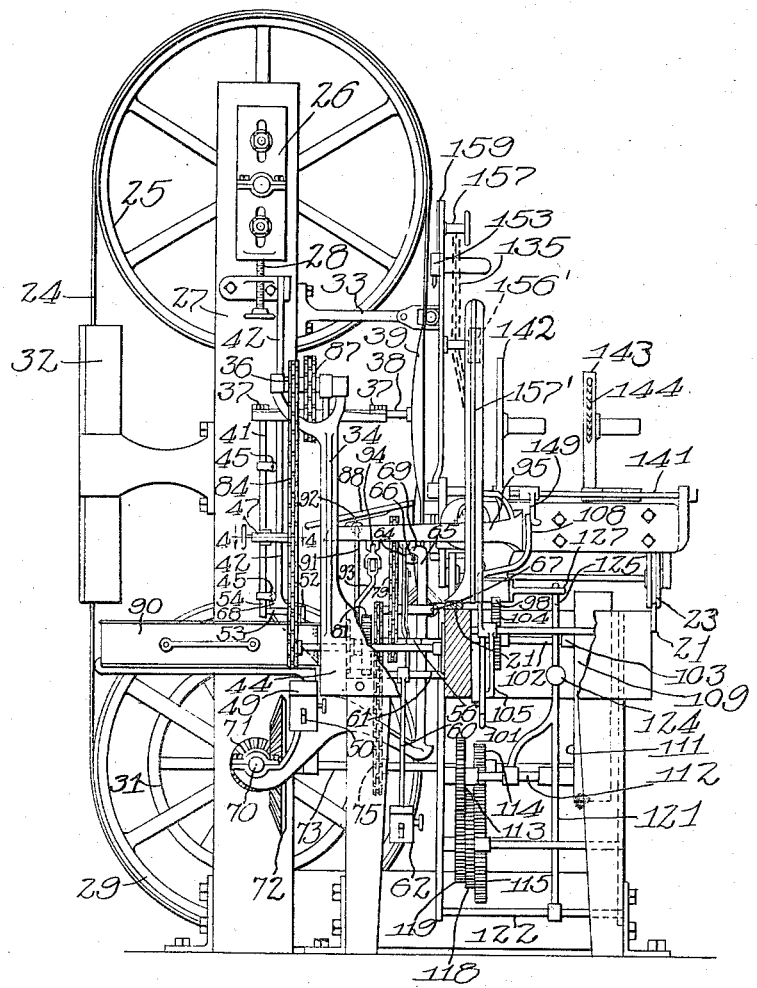

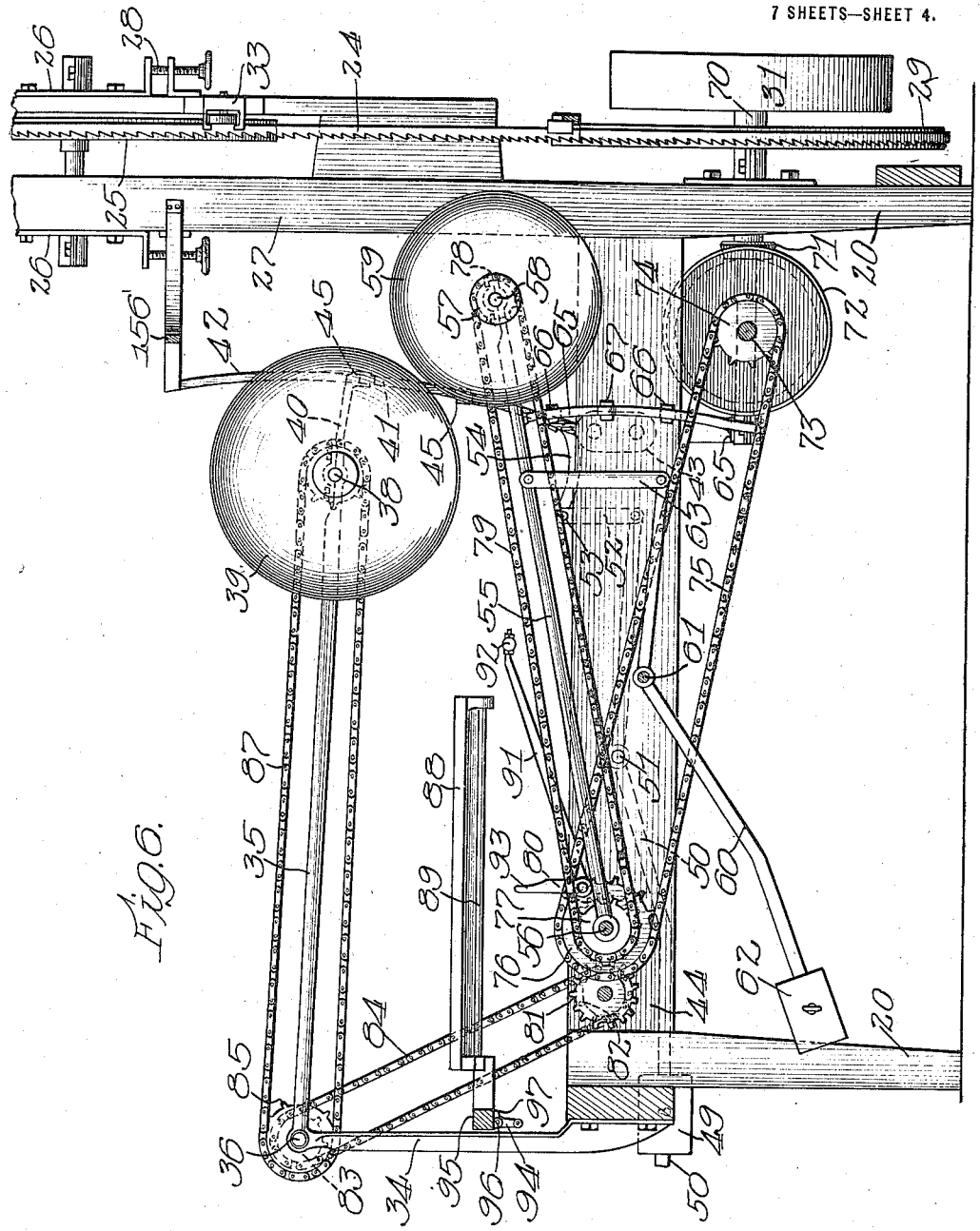

A. M. NEWELL.
MEAT AND BONE CUTTING MACHINE.
APPLICATION FILED MAY 1, 1912.
1,168,822.
Patented Jan. 18, 1916.
7 SHEETS—SHEET 5.
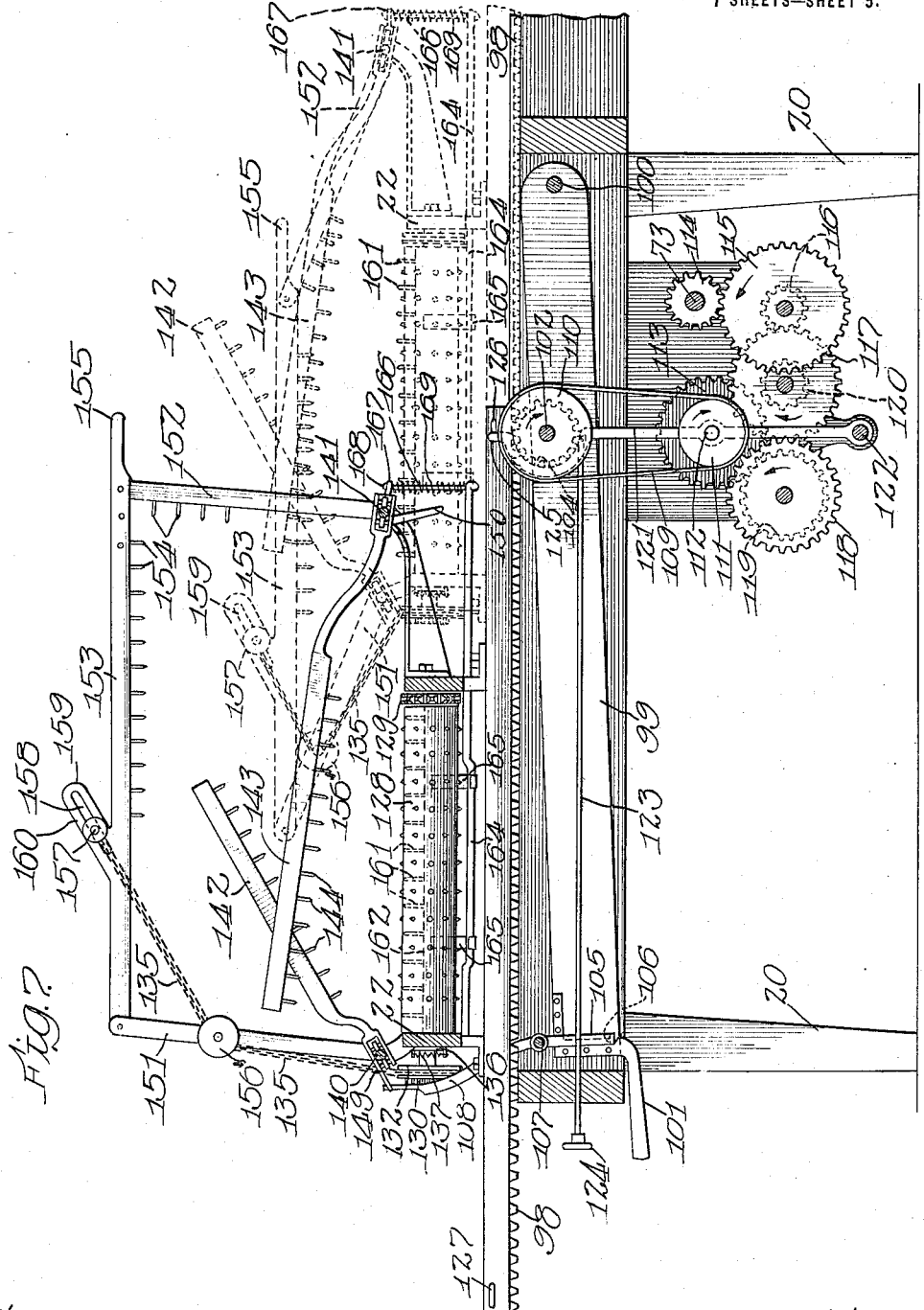
Witnesses:
G. W. Dumaris Jr.
W. F. Kilroy
Inventor:
Atwood M. Newell
By Brown & Hopkins
Attys.

A. M. NEWELL.
MEAT AND BONE CUTTING MACHINE.
APPLICATION FILED MAY 1, 1912.
1,168,822.
Patented Jan. 18, 1916.
7 SHEETS—SHEET 6.
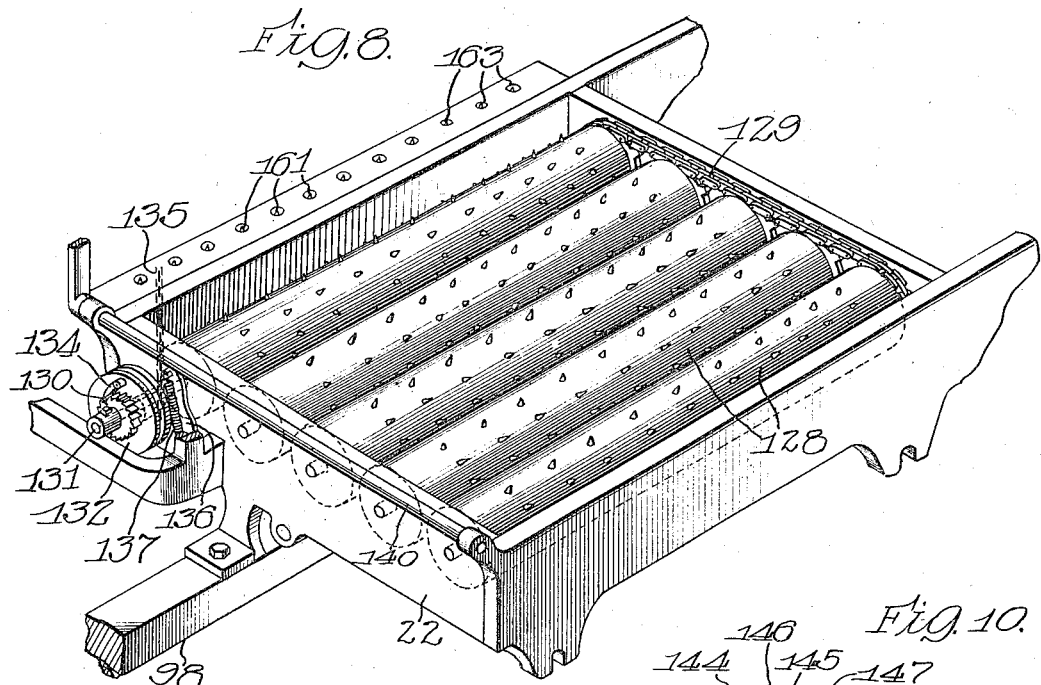
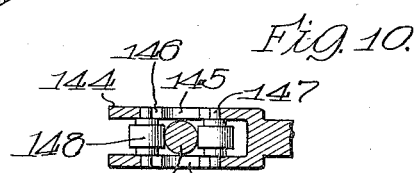
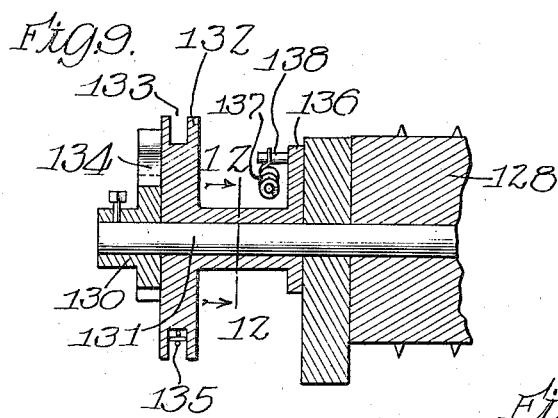
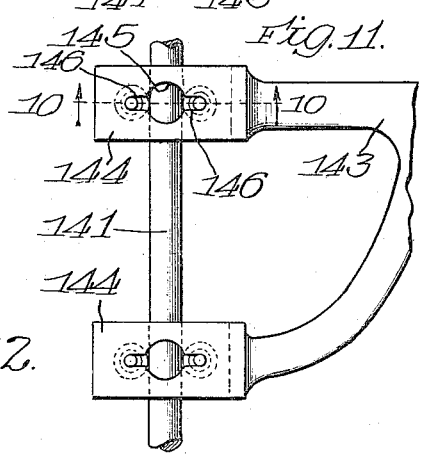
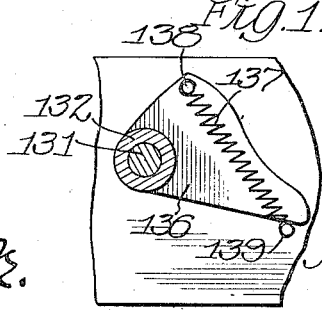

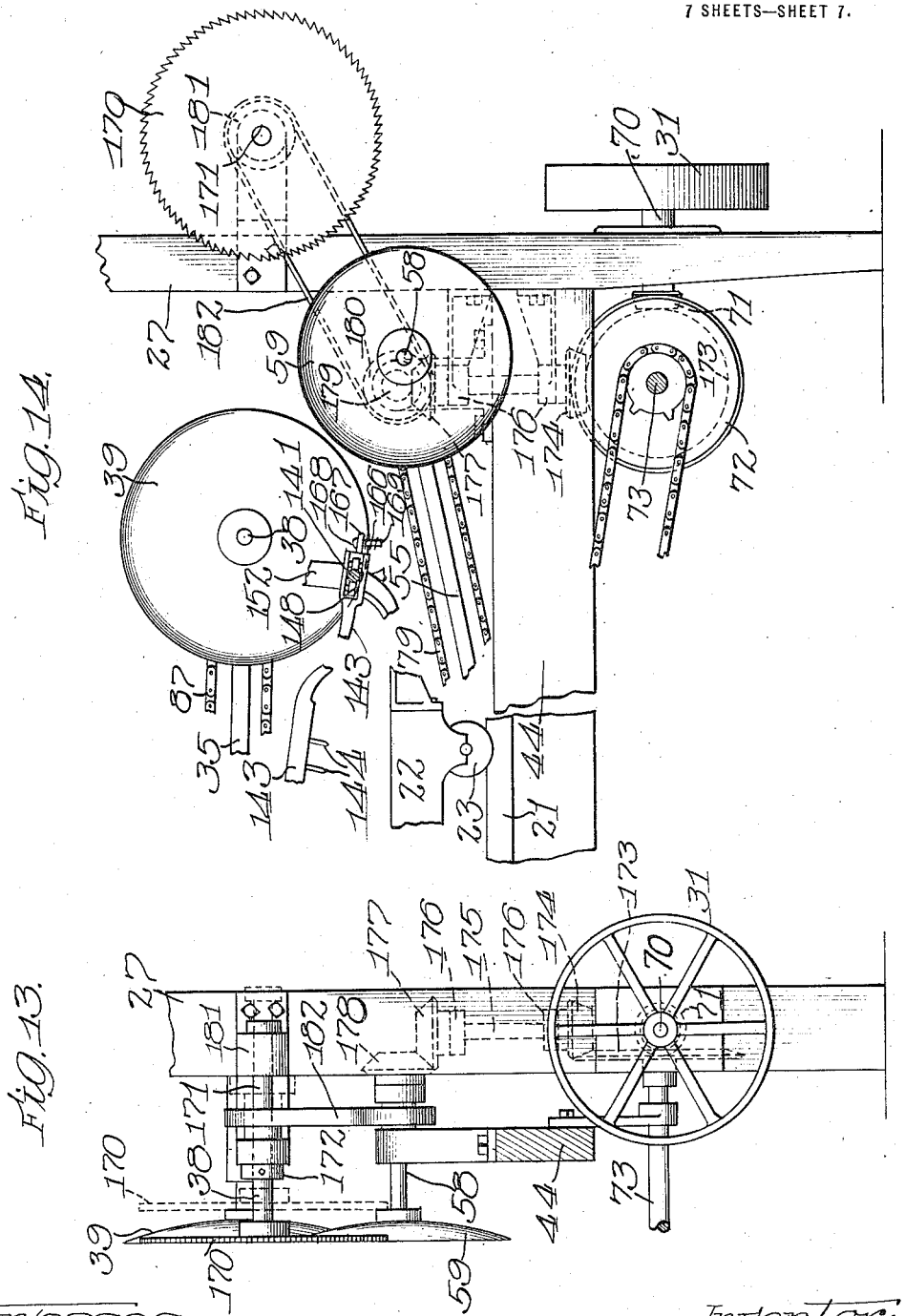

UNITED STATES PATENT OFFICE.

ATWOOD M. NEWELL, OF IRWIN, PENNSYLVANIA, ASSIGNOR TO U. S. SLICING MACHINE COMPANY, OF CHICAGO, ILLINOIS, A CORPORATION OF ILLINOIS.

MEAT AND BONE CUTTING MACHINE.

1,168,822.  Specification of Letters Patent.  Patented Jan. 18, 1916.

Application filed May 1, 1912. Serial No. 694,305.

*To all whom it may concern:*

Be it known that I, ATWOOD M. NEWELL, a citizen of the United States, residing at Irwin, in the county of Westmoreland and State of Pennsylvania, have invented certain new and useful Improvements in Meat and Bone Cutting Machines, of which the following is a specification.

This invention relates to improvements in meat and bone cutting machines, and the primary object of the invention is to provide an improved simple, durable and effective machine of this class, having meat cutters so disposed with respect to each other that they will cut the meat completely around the bone, the machine being also provided with a bone cutting saw whereby complete and uniform slices may be cut from a piece of meat containing one or more bones, during each passage of the piece of meat through the machine, the meat cutters being adapted to be automatically deflected by the bone to permit the bone to pass the cutters.

To the attainment of these ends and the accomplishment of other new and useful objects, as will appear, the invention consists in the features of novelty in substantially the construction, combination and arrangement of the several parts hereinafter more fully described and claimed and shown in the accompanying drawings exemplifying the invention, and in which—

Figure 1 is a view in front elevation of an improved machine of this class, constructed in accordance with the principles of this invention. Fig. 2 is a top plan view of the machine shown in Fig. 1. Fig. 3 is a right hand end elevation of the machine shown in Fig. 1, with parts broken away and partly in section. Fig. 4 is a detailed, sectional view on line 4—4, Fig. 3. Fig. 5 is an enlarged sectional view of one of the meat cutters or knives. Fig. 6 is an enlarged sectional view on line 6—6, Fig. 2. Fig. 7 is an enlarged detailed view, partly in elevation and partly in section, of the meat supporting carriage, showing the meat clamp and holders, together with the driving mechanism, also showing the meat carriage and clamp in dotted position. Fig. 8 is a perspective view of the meat supporting carriage. Fig. 9 is a sectional view of a detail. Fig. 10 is a sectional view on line 10—10, Fig. 11. Fig. 11 is a view of a detail. Fig. 12 is a sectional view on line 12—12, Fig. 9.

Fig. 13 is a right hand end view of the parts shown in Fig. 14, and showing the bone cutting saw in dotted line in one of its positions. Fig. 14 is a detailed view in elevation of a modified arrangement of some of the parts.

Referring more particularly to the drawings, and in the present exemplification of this invention, the numeral 20 designates suitable supports for supporting the mechanism and 21 designates generally a track or way upon which the meat supporting carriage 22 reciprocates. This carriage, as shown more clearly in Fig. 8, comprises a frame supported by rollers 23, having bearings in the frame of the carriage and which rollers travel upon the tracks or guides formed by the frame 21. The frame 21 is of any desired length, according to the length of travel that it is desired to impart to the carriage 22, and in the form of the invention shown in Figs. 1, 2, 3 and 6, there is arranged adjacent one end of the frame a bone cutting saw 24 of the band type, the cutting plane of which saw is adjacent one edge of the carriage 22. This saw 24 is fixed with respect to the frame and to the travel of the carriage 22 and passes over a pulley 25, adjustably mounted in bearings 26, carried by spaced uprights 27, extending above the top of the carriage 22, and adjusting means 28 are provided whereby the tension of the saw may be varied to take up the slack. Another pulley 29 is supported by a bearing 30, arranged beneath the frame 21 and preferably held in position by the adjacent uprights 20, and a drive pulley 31 is connected with the pulley 29 for imparting motion to the saw. Suitable guides 32, 33 (see particularly Fig. 3) may be provided for the band saw 24 for maintaining the same in proper cutting position.

Supported from the main frame and preferably by means of a suitable upright 34 arranged at the end of the frame opposite to the end at which the saw 24 is arranged is an arm 35 which is pivotally connected as at 36 with the upright and this arm 35 extends toward the other end of the machine, as shown more clearly in Figs. 2 and 6, and terminates short of the upright 27. The forward end of the arm 35 is shaped to form spaced bearings 37, in which is journaled the shaft 38 of a rotary meat cutter or knife 39, so that the cutter will be mounted for free bodily movement about the point of pivotal support of the arm 35 and also rotatably with respect to the arm. In order to guide the cutter and the arm, there is provided an extension 40 projecting from one of the bearings 37 in a direction toward the upright 27 and the forward part of this projection 41 extends downwardly toward the frame 21, as shown more clearly in Figs. 3 and 6. A guide 42 is supported in any suitable manner, preferably by the upright 27, and extends from a point above the pivot 36 of the arm 35 toward the frame 21 and is secured at its lower extremity as at 43 to a supporting member 44, which latter is held in position in any suitable manner and is arranged parallel with respect to and spaced from the frame 21. Anti-friction rollers 45 are carried by the deflected portion 41 of the arm 35 to engage one side of the guide 42 and another anti-friction roller 46 (see particularly Figs. 3 and 4) is journaled in a suitable adjustable bearing 47 carried by the portion 41, so as to engage the other side of the guide 42. An adjusting screw 47' is provided so that the tension of the roller 46, and consequently the tension of the rollers 45 on the guide 42 may be varied and, if desired, a yielding member 48 may be provided between the extremity of the screw 47 and the portion 41.

The cutter 39 is counterbalanced upon its point of pivotal support 36 in any suitable manner, such as by means of a counterbalance weight 49, adjustably connected with an arm or lever 50, which is pivoted intermediate its ends, as at 51, to a suitable fixed support, preferably the support 44 (see Figs. 3 and 6). The free extremity of this arm or lever 50 is connected by means of a link 52 at 53 with the extremity 54 of the deflected portion 41 of the projection 40 on the arm 35, and this counterbalancing means permits the cutter 39 to be readily deflected.

Another arm 55 is pivotally supported in suitable bearings, preferably in the support 44, and a portion of the frame 21 as at 56, at a point adjacent the point at which the arm 35 is supported and some distance from the upright 27. This arm 55 extends in a direction toward the upright 27 and terminates short thereof, as shown more clearly in Fig. 2. The forward end of this arm is shaped to form spaced bearings 57, in which is journaled the axle 58 of another rotary cutter 59 and which cutter is arranged adjacent and below the cutter 39. This cutter 59 is thus mounted for bodily movement and also rotary movement with respect to the arm and this arm and cutter are counterbalanced on their pivot by suitable counterbalancing means, such as a lever 60 pivotally supported intermediate its ends, as at 61, and connected to one end of the lever is an adjustable counterbalancing weight 62. The other end of the lever 60 is connected by means of a link 63 with the arm 55. In order to guide the cutter 59 in its bodily movement, suitable guiding means may be provided, such, for instance, as an arm 64 which is secured to the arm 55 adjacent to the cutter and depends below the arm. A guide 65 is supported adjacent this arm in any suitable manner and anti-friction rollers 66 are carried by the arm 64 to engage one side of the guide 65. Another anti-friction roller 67 is carried by the arm and engages the opposite side of the guide 65, and this anti-friction roller 67 is supported in a manner similar to the anti-friction roller 46 and for the same purpose as the latter. A guide 42 is provided with a stop 68 (see Fig. 3) to limit the downward movement of the cutter 39 and the guide 65 is provided with a stop 69 for limiting the upward movement of the cutter 59. Thus it will be seen that the cutters, 39, 59 are mounted for free bodily movement toward and away from each other and are also rotatably mounted with relation to the respective arms.

Motion is imparted to these cutters from a common source of power, preferably from the drive pulley 31 through the medium of a shaft 70, which is provided with a beveled gear 71 meshing with a gear 72 on a shaft 73 (see particularly Figs. 3 and 6), and this shaft 73 has connected with it a sprocket 74 over which a sprocket chain 75 passes and a sprocket 76 is connected with the pivot 56, the latter being preferably in the form of a shaft. This shaft or pivot 56 has connected for rotation therewith another sprocket 77 and a sprocket 78 is connected with the axle 58 of the cutter 59. A sprocket chain 79 passes over the sprockets 77, 78 so that when the shaft 73 is rotated, the cutter 59 will also be rotated. Motion is imparted to the cutter 39 from the shaft or pivot 56 through the medium of a gear 80 (see Figs. 1, 3 and 6), which meshes with a gear 81, which gear 81 has connected with it for rotation therewith a sprocket 82. A corresponding sprocket 83 is secured to the pivot 36 forming the support for the arm 35 and which pivot 36 is also in the form of a shaft, and a sprocket chain 84 passes over the sprockets 82 and 83. Secured also with the shaft or pivot 36 is another sprocket wheel 85 with which a sprocket 86 coöperates and which sprocket 86 is secured to the axle 38 of the cutter 39. A sprocket chain 87 passes over the sprockets 85 and 86 and serves to rotate the cutter 39 when the shaft 73 is rotated. By thus mounting the cutters 39, 59 so that they will work in opposition to each other and by counterbalancing them for bodily movement in directions toward and away from each other, it will be manifest that when the piece of meat is passed between the cutters in a manner to be hereinafter described, the cutters will operate on opposite sides of the bone of the meat and by being thus freely mounted and counterbalanced, they will be deflected by the bone when they contact with the bone in the meat, thus causing the meat to be cut around the bone, and the deflection of one of the cutters will not interfere with the deflection or operation of the other.

The cutting planes of the knives or cutters are so arranged with respect to the travel of the carriage 22 that when the meat is supported by the carriage and the latter is moved toward the cutters, the latter will operate in close proximity to the edge of the carriage, as clearly shown in Fig. 2, and the cutting edges of the knives are arranged in alinement with each other.

The saw 24 is fixed with relation to the cutters, 39, 59 and its cutting plane is also arranged in alinement with the cutters, 39, 59. The saw is so mounted that after the bone passes away from the cutters, 39, 59 and the meat has been cut around the bone by these cutters, the saw will operate upon the bone to cut it, after which the slice thus cut will fall upon a receiver 88 carried with the carriage 22. This receiver 88 is arranged on the other side of the cutters, 39, 59 and is spaced from the carriage 22, as shown in Fig. 2. This receiver is supported for pivotal movement in any suitable manner, such as by means of an arm or pivot 89 supported in any suitable manner and arranged so that the receiver may be dumped outwardly or away from the carriage 22 to deliver the slices into a receptacle 90 supported upon any suitable support. This receptacle 90 is arranged preferably adjacent the cutters so that the slices may be delivered thereto as soon as cut, although the position of the receptacle is immaterial. Any suitable means may be provided for dumping the receiver 88 in an automatic manner, preferably so that it will be dumped by the movement of the carriage 22. In order to accomplish this, an arm 91 is pivotally supported in any suitable manner so that one extremity is arranged beneath the receiver 88 and in the line of movement thereof. A bumper 92 is secured to this extremity of the arm and an extension 93 is connected with the arm and is arranged to be engaged by a projection 94 carried by an arm 95 connected with the carriage 22 (see particularly Figs. 3 and 6). This projection 94 is pivotally supported as at 96 and is provided with a stop 97 so that when the carriage moves forwardly to present the meat to the meat cutters 39, 59, the projection will ride over the extension 93 and when the carriage is moving away from the cutters 39, 59, after the slice has been cut, the stop 97 will cause the projection 94 to be held rigidly in position so that the latter will engage the projection 93 on the arm 91 to rock the arm and move the bumper 92 into engagement with the receiver 88 and thereby rock the latter about its point of pivotal support to dump the slice into the receptacle 90. When the projection 94 passes out of engagement with the extension 93, the receiver 88 will return to its normal position to receive another slice, this being accomplished by the fact that the preponderance of weight of the receiver is on one side of the pivot.

The cutters 59, 39 are concaved, as shown more clearly in Fig. 5, that is, the cutting edges or the peripheries of the cutters are beveled only on the outside or convexed surface, the concaved or inner face of the cutters receding abruptly and directly from the cutting edge to prevent the formation of a beveled or inclined face adjacent the cutting edge and on the concaved side of the cutter, which beveled edge would be arranged at an angle to the remaining portion of the concave surface. By the provision of such a cutter, they will operate upon the meat when they are cutting to draw the meat or will have a tendency to draw the meat from the piece during the cutting operation, so that after the slice has been cut by these cutters, the meat in the piece from which the slice has been cut will recede or spring backwardly and thereby move out of the cutting plane of the saw a sufficient distance to clear the saw, while the bone is being cut, which will prevent the meat in the piece from being scratched or cut by the saw, while the slice which has been cut will be moved or forced away from the piece of meat by the convex side of the knife and thereby cause it to fall clear of the cutting plane of the saw.

The carriage 22 is adapted to be automatically reciprocated upon the frame 21 and a simple and efficient means for thus reciprocating the carriage will now be described: Carried by the carriage and projecting from the lower face thereof is a rack member 98 which is of a length somewhat greater than the width of the carriage and is disposed so that it will stand between the guides of the frame 21 (see Figs. 3, 7 and 8). This rack member may be formed in any manner and may be secured to the carriage in any suitable manner. Arranged between the spaced members forming the frame 21 and extending longitudinally thereof is a member 99 preferably in the form of an arm which is pivotally supported by one end, as at 100 (see particularly Fig. 7), and the free end of this arm extends toward and terminates adjacent one end of the frame. A handle 101 is connected to the free end of the arm 99 by means of which it can be reciprocated. A shaft 102 is journaled in the member 99 and also in a suitable support 103 (see Fig. 7) and connected to this shaft for rotation therewith is a gear 104 which is adapted, when the member 99 is moved about its pivot 100, to be moved into and out of engagement with the rack 99. This member 99 is held in position so that the gear 104 will mesh with the rack by means of a suitable catch 105 which engages a shoulder 106 preferably on the handle 101, and thereby locks the parts in position. This catch 105 is pivotally mounted, as at 107, and is provided with a projecting portion 108 extending above the frame 21 for a purpose to be hereinafter set forth. Motion is imparted to the gear 104 by means of a belt 109 which passes over a pulley 110 connected with the gear 104 and also a pulley 111 which is connected with a shaft 112 and to which shaft is connected a gear 113. It will be seen, therefore, that when the gear 104 (assuming it to be in the position as shown in Fig. 7) is rotated, the rack 98 will be moved and with it the carriage 22, and the direction of movement of the carriage and rack 98 will be controlled by the direction of rotation of the gear 104. This direction of rotation of the gear 104 may be controlled automatically in any suitable manner. A simple and efficient means will now be described, reference being had particularly to Fig. 7.

Connected with the shaft 73 is a gear 114 which meshes with a gear 115, and connected with this gear 115 for rotation therewith is a gear 116 which in turn meshes with another gear 117, and this gear 117 meshes with a gear 118, connected with which latter gear for rotation therewith is a gear 119 with which the gear 113 meshes. All of these gears are mounted in a suitable frame having suitable bearings and are preferably arranged below the frame 21. Thus it will be seen that assuming the gears to be in the position shown in Fig. 7, the gear 104 will be rotated in one direction or the direction indicated by the arrows on the gears, and this will cause the carriage 22 to travel toward the right or toward the cutters 39, 59. In order to reverse the direction of rotation of the gear 104 so as to return the carriage to the position shown in full lines in Fig. 7, all that is necessary is to switch the gear 113 out of mesh with the gear 119 and into mesh with a gear 120, which latter is connected with the gear 117 for rotation therewith. When the gear 113 is in mesh with the gear 120, the direction of rotation of the gear 113 and the gear 104 will be reversed.

In order to accomplish this shifting of the gear 113, the latter is mounted upon an adjustable support, such as an upright 121 pivotally supported as at 122 and connected with this upright is a bar or rod 123 having a handle 124 arranged in a convenient position for the operator. (See also Fig. 3). In order that the gear 113 may be automatically shifted and which automatic shifting may be controlled by the movement of the carriage 22, the support 121 is provided with an extending portion 125 (see Figs. 1 and 3), which projects into the path of movement of spaced lugs or extensions 126, 127 carried preferably by the rack 98 and projecting laterally therefrom. These projections 126, 127 are so arranged with respect to the carriage 22 that just before the carriage reaches the limit of its movement in either direction the respective projection 126, 127 will engage the portion 125 of the support 121 and rock the latter about its point of pivotal support 122 to correspondingly shift the gear 113 into or out of mesh with the respective gears 119, 120.

In order to feed the meat forwardly on the carriage 22 after a slice has been cut therefrom so as to present it in proper cutting relation to the cutters to cut another slice, automatic feeding mechanism is provided and a simple and efficient mechanism of this character will now be described.

The carriage 22 in the present form of the invention is provided with a series of spiked or toothed rollers 128, which are connected together to be driven in unison by means of a suitable chain or belt 129, and these rollers are arranged to extend in directions longitudinally with respect to the reciprocating movement of the carriage. One of the rollers is provided with driving mechanism by means of which an intermittent movement may be imparted to all of the rollers, and in the present form of the invention, this driving mechanism comprises a ratchet wheel 130 (see particularly Figs. 8, 9 and 12), which is secured for rotation with one of the rollers, preferably to the axle 131, which projects beyond the carriage. A drum or pulley 132 having a grooved periphery 133 is loosely mounted upon the axle 131 and a pawl 134 is pivotally supported by the pulley 132 and coöperates with the ratchet wheel 130. A flexible member 135 is secured by one extremity to the pulley 132 and within the groove 133 and is adapted to be wound and unwound from the pulley. This pulley is provided with an arm 136 connected therewith and an elastic member 137 is secured by one extremity as at 138 to the arm 136 and by its other extremity, as at 139, to a fixed support, and is so arranged that when the flexible member 135 is unwound from the pulley, the arm 136 will be rocked to create a tension on the elastic member 137, so that when the flexible member 135 is released or slackened, the elastic member 137 will rock the arm 136 to rotate the pulley in the opposite direction and thereby wind the flexible member 135 upon the pulley. The pawl 134 and the teeth of the ratchet 130 are so disposed that when the elastic member 135 is unwound, the pulley will be locked with respect to the roller 128 and the latter will be rotated, but when the elastic member is wound upon the pulley, the pawl will ride over the ratchet teeth, as will be understood.

The carriage is provided with spaced bars or rods 140, 141 (see particularly Figs. 2 and 7) which are supported in any suitable manner and extend parallel with the sides of the carriage and longitudinally with respect to the line of feeding movement of the meat with respect to the carriage, and a pair of meat holders 142, 143 are provided for holding and guiding the meat during its movement upon the carriage. These meat holders are preferably in the form of arms having spikes 144 projecting therefrom, which spikes engage the meat from above. In the present form of the invention two of these arms are shown and one arm is pivotally supported by one end from each of the rods 140, 141 and each arm is shaped to form spaced bearings 144 and which bearings are bifurcated, as shown in Fig. 10, to form upper and lower members extending over the rods. Each of these members of the bifurcated portion is provided with an aperture 145 being arranged to register, and each aperture is in turn provided with laterally extending reduced slots 146 communicating with the apertures, and these slots 146 serve as bearings for the trunnions 147 of anti-friction rollers 148.

The rollers are adapted to be inserted in position through the apertures 145 so as to stand on each side of the respective rods 140, 141, thereby reducing the friction between the arms and the rods and at the same time permitting a pivotal movement of the arms with respect to the rods. These arms 142, 143, after the meat has been placed in position on the rollers 128, are forced into engagement with the meat and inasmuch as they engage the meat from opposite sides of the carriage they will hold the meat steadily during its feeding movement on the carriage, and as these arms are adapted to travel on the rods 140, 141, they will be advanced by the feeding movement of the meat. In order to disconnect the carriage 22 or rather the rack 98 and the gear 104 at a pre-determined time with respect to the feeding movement of the meat on the carriage, means is provided whereby the catch 105 (see Fig. 7) may be tripped so that the weight of the member 99 will cause it to drop about its point of pivotal support 100 and shift the gear 104 out of engagement with the rack 98 when one of the arms reaches a pre-determined point in its travel on its respective rod. For this purpose and in the present form of the invention, the arm 142 is provided with an extension 149 (see Figs. 3 and 7), having a cam portion which is adapted to engage the projecting portion 108 on the catch 105 to rock the latter about its point of pivotal support 107 and cause it to move out of engagement with the shoulder 105, thereby releasing the member 99, permitting it to fall, and with it the gear 104, which by this movement will drop out of engagement with the rack 98. The gear 104 is repositioned by raising the member 99 by the handle 101.

If desired, and in order to maintain the meat holder 143 in an elevated position or a position to permit the meat to be placed upon the carriage, an arm 150 is connected with the holder 143 (see Figs. 1 and 7) and is so arranged that when the holder is elevated, the arm will engage a fixed portion of the carriage.

To hold the meat steadily while being cut, a meat holder or clamp is provided on the carriage and is arranged adjacent the forward edge of the carriage, that is, the edge adjacent the cutters and in the present form of the invention preferably comprises two members 151, 152, which are pivotally connected by one extremity to the carriage, preferably to the respective bars 140, 141, and are adapted to extend uprightly, as shown in full lines, Fig. 7. A cross bar or member 153 is pivotally connected to the upper extremities of these members 151, 152 and extends across the carriage above the meat, and spikes 154 are provided on the members 152, 153 which penetrate the meat when the clamp or holder is moved into clamping position. The clamp thus formed is movable into and out of positions shown in full and dotted lines in Fig. 7 and it is held in the position shown in full lines in Fig. 7 in any suitable manner so that the pivots between the member 153 and the members 151, 152 will pass over the center. During the movement of the carriage to the right (in Figs. 1 and 7) or in the direction to present the meat to the cutters, the clamp or holder is adapted to be automatically moved from the position shown in full lines in Fig. 7 to that shown in dotted lines, and this is accomplished by means of a projecting portion 155 on the clamp engaging with a stop or laterally projecting arm 156, located at a proper position with respect to the cutters. During the advancement of the carriage, this portion 155 will strike the stop 156 and will cause the pivots between the members 151, 152 and the member 153 to be moved over the center in the opposite direction so that the weight of the clamp will cause it to fall toward the meat and into the position shown in dotted lines, Fig. 7. The clamp will remain in this position until the meat is cut and until the carriage approaches the end of its return movement, at which time the clamp is automatically raised with respect to the carriage and moved into an unclamping position. This is accomplished by means of an anti-friction roller 156' journaled to the member 151 which is adapted to engage a cam guide 157' supported in any suitable manner. As the carriage approaches the limit of its return movement, when the clamp is in the position shown in dotted lines in Fig. 7, the anti-friction roller 156' engages the guideway 157' and by a continued movement of the carriage in the same direction, the clamp will be moved into the full line position, Fig. 7, and thereby release the meat.

In order to effect an automatic feeding movement of the meat with respect to the carriage, so as to advance the meat and present a new portion to the cutters when the carriage is again moved forward, this clamping and unclamping movement of the meat holder or clamp is utilized and the result is accomplished by means of the flexible member 135, the free end of which is adjustably connected to the member 153 of the clamp, preferably by means of a bolt and slot connection 157, 158, which slot is preferably formed in an extension 159 on the member 153 having graduations 160 thereon.

It will thus be manifest that when the clamp is moved from the full line position to the dotted line position, Fig. 7, the elastic member 137 (see Figs. 8 and 12) will cause the flexible member 135 to be wound on the pulley 132 which will position the pawl 134 with respect to the ratchet 130, as already described. It will also be seen that when the clamp is raised from the dotted line position to the full line position in Fig. 7, the flexible member 135 will be unwound from the pulley just as the clamping member is moving to an inoperative position and will impart a rotary motion to the rollers 128 of the carriage 22 after the clamping members have passed out of engagement with the meat, thereby effecting an automatic and intermittent feeding of the meat with respect to the carriage. In order that the degree of this feeding movement may be varied, the bolt and slot connection 157, 158 and the graduations 160 are provided. When the meat clamp is out of engagement with the meat, the meat holders 142, 143 will be in engagement with the meat, to steady the meat and will also hold the meat during this feeding movement with respect to the carriage. Obviously, each time the carriage makes one complete cycle of reciprocation, the clamp will have been into and out of clamping position with respect to the meat and the meat will have been automatically advanced with respect to the carriage. The reciprocating movement will be effected by reversing the direction of operation of the gear 104 either automatically or manually, as has been already described, but if it is effected automatically, it will be shifted by the projections 127, 126. The reciprocating movement of the carriage may be stopped without stopping the drive shafts and the cutters and saw by disconnecting the gear 104 from the rack 98, which may be done manually by grasping the projection 108 of the catch 105 and swinging the latter about its pivot to release the member 99.

However, in order to automatically effect or stop the reciprocating movement of the carriage when the meat, which is on the carriage, has been cut up, that is, when there is no more meat present to be cut, the holder 142 is so arranged that upon the return movement of the carriage, after the last slice has been cut, the cam portion 149 on the holder will strike the projection 108 of the catch 105 and automatically trip it.

An additional holder is provided on the carriage which coöperates with the clamp and in the present exemplification of the invention comprises a series of pins or spikes 161 which are connected with a member 162 (see Figs. 7 and 8) to extend across the front edge of the carriage. These pins or spikes are adapted to be projected and retracted with respect to the surface of the carriage through suitable apertures 163 in a portion of the frame of the carriage, so as to be moved into and out of engagement with the meat and a rock shaft 164 journaled below the rolls 128 to extend across the carriage is connected by means of suitable clips 165 with the member 162, so that when the shaft 164 is rocked in one direction the pins or spikes will be projected to engage the meat, and when rocked in the opposite direction will be retracted. By connecting these pins or spikes with the clamping members for operation therewith, they may be correspondingly moved into or out of engagement with the meat by the movement of the clamp, so as to release the meat and permit it to be fed with respect to the carriage. This is accomplished by means of a connection 166 between the shaft 164 and a projection 167 on the member 152. This connection 166 preferably passes loosely through the projection 167 and is provided with a head 168, and an elastic member 169 in the form of a spring is coiled about the connection for purposes to be set forth. When the clamp is moved into clamping position, the shaft 164 will be rocked to project the pins 161 but when it is moved into an inoperative position, the shaft 164 is rocked to retract the pins. The elastic member 169 tends to retract the pins and also serves as a cushion for the clamping member.

It is thought that from the above description the operation of the machine will be fully understood, but briefly stated, it is as follows: Assuming the driving mechanism to be operating, the gear 104 to be moved out of engagement with the rack 98, and the carriage at the extreme left (Fig. 1). The meat is placed upon the carriage and the meat holders 142, 143 adjusted to proper position. The member 99 is shifted by the handle 101 (see Fig. 7) to move the gear 104 into engagement with the rack 98. This causes the carriage to move toward the cutters. When the carriage has moved a short distance, the clamp members 151, 152 and 153 are automatically thrown over to clamping position, and the spikes 161 thrown into engagement with the meat. The carriage then advances to the cutters so that the meat will pass between the cutters 39, 59. These cutters will cut the meat around the bone and will be automatically deflected by the bone in directions away from each other. As the meat passes from the cutters, it approaches the saw 24 and the saw operates upon the bone to cut the same. The slice then falls away from the piece of meat onto the receiver 88. By the time this operation is completed, the carriage will have reached a position in which the projection 127 on the rack 98 will engage the projection 125 on the support 121 to shift the latter and with it the gear 113 to move it into mesh with the gear 120. This will reverse the direction of rotation of the gear 104 and the carriage 22 will begin to return to its normal position. As it returns the projection 94 will engage the extension 93 on the arm 91 to rock the latter and dump the receiver, thereby depositing the slice in the receptacle 90. During the return movement of the carriage, the roller 156 will engage the cam guide 157 and the clamp comprising the members 151, 152 and 153 will be moved into unclamping position. During this movement of the clamp the rollers 128 will be rotated and the meat will be advanced on the carriage to position it for another slice. The projection 126 will then engage the projection 125 on the support 121 to shift the gear 113 out of mesh with the gear 120 and into mesh with the gear 119, thereby reversing the direction of rotation of the gear 104 to advance the carriage. This operation will be continued as long as desired or as long as there is any meat to be cut. The reciprocation of the carriage may be stopped at any time by the operator by grasping the handle 101 (Fig. 7) and releasing the member 99, or it may be stopped automatically at the completion of the cutting operation by the engagement of the cam projection 149 on the meat holder 142 with the extension 108 on the catch 105.

In the form of the invention shown in Figs. 13 and 14, a circular saw 170 is provided in place of the band saw and this circular saw is connected with a shaft 171 journaled in suitable bearings, preferably supported by the support 27 so that it may be shifted longitudinally in its bearings and with it the saw 170 so as to move the saw into and out of cutting position with relation to the cutters 39, 59. This mechanism is provided in the event that it is desired to slice meat in which there is no bone and at which time the saw may be disconnected, while with this construction the saw may be readily positioned for use when meat containing a bone is cut. This shifting of the saw 170 is preferably in a lateral direction and is accomplished by means of a collar 172 which is secured to the shaft 171 and is adapted to abut one of the bearings of the shaft so that by loosening the collar the saw may be laterally adjusted and by tightening it it may be secured in position.

Motion is imparted to the saw 170 in any suitable manner, preferably from the shaft 73 through the medium of a beveled gear 173 connected with the shaft 73 and which meshes with the beveled gear 174 on an upright shaft 175 journaled in suitable bearings 176 on the support 27 and to which shaft 175 is connected another beveled gear 177. This latter gear meshes with a beveled gear 178 on a shaft 179 to which is secured for rotation therewith a belt pulley 180. Another belt pulley 181 is provided on the shaft 171 of the saw 170 and a drive belt 182 passes over the pulleys 180, 181. When the saw 170 is shifted laterally into an inoperative position, the belt 180 may be thrown off of its pulleys, as will be understood. Any other form of drive may be provided for the saw 170 which will permit of the lateral adjustment of the saw, as above described.

While there is shown and described in the present exemplification of the invention various forms of gearing, connections, mountings, drive mechanisms, etc., it is to be understood that various changes and departures may be made from these features as herein shown and still come within the scope of the claims of this invention, and for this reason it is not desired to be limited to the exact details of construction herein shown.

What is claimed as new is:—

1. In a machine of the class described, the combination of a pair of oppositely disposed meat cutting devices, and a bone cutting device coöperating with such devices.

2. In a machine of the class described, the combination of a pair of oppositely disposed meat cutting devices adapted to operate on opposite sides of a bone in the meat, and a bone cutting device coöperating with said devices for cutting the bone, all of said devices operating in alinement.

3. In a machine of the class described, the combination of a pair of oppositely disposed meat cutting devices adapted to operate on opposite sides of a bone in the meat and to be deflected by a bone in the meat, and a bone cutting device for cutting the bone in the meat.

4. In a machine of the class described, the combination of a pair of oppositely disposed rotary meat cutting devices adapted to operate on opposite sides of a bone in the meat and to be deflected by a bone in the meat, and a bone cutting device for cutting the bone after the meat has been cut around the bone.

5. In a machine of the class described, the combination of a pair of oppositely disposed rotary meat cutters adapted to operate on opposite sides of a bone in the meat and to be automatically deflected by the bone, a bone cutting saw, and means for presenting the meat and the cutters and saw in cutting relation.

6. In a machine of the class described, the combination of a pair of oppositely disposed rotary meat cutters, adapted to operate on opposite sides of a bone in the meat and to be automatically deflected by the bone, a bone cutting saw, and means for presenting the meat in cutting relation to the cutters and the saw successively.

7. In a machine of the class described, the combination of a pair of rotary meat cutters mounted for free bodily movement in directions toward and away from each other and adapted to be deflected away from each other by a bone in the meat, and a bone cutting saw for cutting the bone.

8. In a machine of the class described, the combination of a pair of rotary meat cutters, mounted for free bodily movement in directions toward and away from each other and adapted to be deflected away from each other by a bone in the meat, and a bone cutting saw for cutting the bone, said saw having a fixed relation to the said cutters.

9. In a machine of the class described, the combination of a pair of rotary meat cutters mounted for free bodily movement to operate on opposite sides of a bone in the meat and adapted to be automatically deflected by the bone, a support for the meat, said cutter and the support being capable of relative movement whereby the meat and cutters may be presented in cutting relation, and a saw for cutting the bone.

10. In a machine of the class described, the combination of a pair of rotary meat cutters mounted for free bodily movement to operate on opposite sides of a bone in the meat and adapted to be automatically deflected by the bone, a support for the meat, said cutters and the support being capable of relative movement whereby the meat and cutters may be presented in cutting relation, and a saw for cutting the bone, said support and saw being also relatively movable whereby the saw and bone may be presented in cutting relation.

11. In a machine of the class described, the combination of a pair of rotary meat cutters mounted for free bodily movement to operate on opposite sides of a bone in the meat and adapted to be automatically deflected by the bone, a support for the meat, said cutters and the support being capable of relative movement whereby the meat and cutters may be presented in cutting relation, a saw for cutting the bone, and counterbalancing means for the said meat cuttters.

12. In a machine of the class described, the combination of a pair of rotary meat cutters mounted for free bodily movement to operate on opposite sides of a bone in the meat and adapted to be automatically deflected by the bone, a support for the meat, said cutters and the support being capable of relative movement whereby the meat and cutters may be presented in cutting relation, a saw for cutting the bone and adjustable counterbalancing means individual to the said meat cutters.

13. In a machine of the class described, the combination of a pair of rotary meat cutters mounted for free bodily movement to operate on opposite sides of a bone in the meat and adapted to be automatically deflected by the bone, a support for the meat, said cutters and the support being capable of relative movement whereby the meat and cutters may be presented in cutting relation, means for guiding the cutters in their bodily movements, and a saw for cutting the bone.

14. In a machine of the class described, the combination of a pair of rotary meat cutters mounted for free bodily movement to operate an opposite sides of a bone in the meat and adapted to be automatically deflected by the bone, a support for the meat, said cutters and the support being capable of relative movement whereby the meat and cutters may be presented in cutting relation, means for guiding the cutters in their bodily movements, and a saw for cutting the bone, said saw being fixed with relation to the meat cutters.

15. In a machine of the class described, the combination of a pair of rotary meat cutters mounted for free bodily movement to operate on opposite sides of a bone in the meat and adapted to be automatically deflected by the bone, a support for the meat, said cutters and the support being capable of relative movement whereby the meat and cutters may be presented in cutting relation, means for guiding the cutters in their bodily movements, a saw for cutting the bone, and counterbalancing means for the meat cutters.

16. In a machine of the class described, the combination of a cutting mechanism for meat and the like, a support for the meat, said support being capable of movement toward and from said cutting mechanism whereby the meat and cutting mechanism may be presented in cutting relation, a slice support carried by said meat support, and means controlled by the movement of said supports for tilting the slice support downwardly for disposal of the slice from the slice support to a receiver.

17. In a machine of the class described, the combination of a cutting mechanism, a support for the meat, said cutting mechanism and support being capable of relative movement whereby the meat and cutting mechanism may be presented in cutting relation, a slice support carried by said meat support, and means controlled by the movement of said support for tilting the slice supports downwardly for dumping the slices from the slice support.

18. In a machine of the class described, the combination of a meat cutter, a support for the meat movable relative to said meat cutter whereby the meat and cutter may be presented in cutting relation, a slice support carried by said meat support, and means controlled by the movement of said supports for automatically tilting the slice support downwardly for dumping the slice from the slice support.

19. In a machine of the class described, the combination of a meat cutter, a meat support movable relative to said cutter, a slice support mounted on a horizontal pivot carried by said meat support, means for dumping the slice support, and means actuated by the movement of said supports for controlling the last said means automatically.

20. In a machine of the class described, the combination of a rotary meat cutter adapted to be automatically deflected by a bone in the meat, a bone cutting device, a meat support, and means whereby the bone cutting device may be shifted to an inoperative position.

21. In a machine of the class described, the combination of a rotary meat cutter adapted to be automatically deflected by a bone in the meat, a bone cutting device, a meat support, and means whereby the bone cutting device may be rendered inactive while the meat cutter remains active.

22. In a machine of the class described, the combination of a rotary meat cutter adapted to be deflected by a bone in the meat, a bone cutting saw, a meat support, said cutter and saw and the meat support being capable of relative movement, whereby the meat and the cutter and the meat and the saw may be presented successively in cutting relation, and means whereby the saw may be rendered inactive while the cutter remains active.

23. In a machine of the class described, the combination of a rotary meat cutter, adapted to be deflected by a bone in the meat, a bone cutting saw, a meat support, said cutter and saw and the meat support being capable of relative movement, whereby the meat and the cutter and the meat and the saw may be presented successively in cutting relation, and means whereby the saw may be shifted and maintained out of cutting position with relation to the meat support.

24. In a machine of the class described, the combination of a rotary meat cutter mounted to be automatically deflected by a bone in the meat, a meat support, said cutter and support being capable of relative movement for presenting the meat and cutter in cutting relation, a bone cutting saw, said saw and support being also relatively movable whereby upon each of such relative movements the saw will act upon the bone to cut it, and means whereby one or more of such relative movements of the saw and support may be obtained without the saw operating upon a bone.

25. In a machine of the class described, the combination of a rotary meat cutter, mounted to be automatically deflected by a bone in the meat, a bone cutting saw, a reciprocating meat support for successively presenting the meat to the cutter and saw, and power mechanism for operating the support and the cutter and saw, said mechanism embodying means for reversing the movement of the support.

26. In a machine of the class described, the combination of a rotary meat cutter, mounted to be automatically deflected by a bone in the meat, a bone cutting saw, a reciprocating meat support for successively presenting the meat to the cutter and saw, power mechanism for operating the support and the cutter and saw, said mechanism embodying means for reversing the movement of the support, and means for controlling the said reversing means automatically.

27. In a machine of the class described, the combination of a rotary meat cutter, mounted to be automatically deflected by a bone in the meat, a bone cutting saw, a reciprocating meat support movable relatively to the cutter and saw for successively presenting the meat to the cutter and saw, power mechanism for operating the support and the cutter and saw, said mechanism embodying means for reversing the movement of the support, and means whereby the movement of the meat support will automatically control the said reversing means.

28. In a machine of the class described, the combination of a rotary meat cutter, mounted to be automatically deflected by a bone in the meat, a bone cutting saw, a reciprocating meat support movable relatively to the cutter and saw for successively presenting the meat to the cutter and saw, power mechanism for operating the support and the cutter and saw, said mechanism embodying means for reversing the movement of the support, means for controlling the said reversing means automatically, and additional means for controlling the reversing means manually.

29. In a machine of the class described, the combination of a meat cutter, a meat support movable relatively thereto, a meat clamp carried with the support and adapted to be rendered active by one movement of the support and to be rendered inactive by another movement of the support, and also adapted, when rendered active, to clamp meat carried by said support independently of parts other than those carried by said support.

30. In a machine of the class described, the combination of a meat cutter, a reciprocating meat support, a meat clamp carried with the support and adapted to be rendered active by each movement of the support in one direction, and to be rendered inactive by each movement of the support in another direction and also adapted, when rendered active, to clamp meat carried by said support independently of parts other than those carried by said support.

31. In a machine of the class described, the combination of a meat cutter, a reciprocating meat support, a meat clamp carried with the support and adapted to be automatically rendered active upon each movement of the support in one direction, and to be automatically rendered inactive upon each movement of the support in another direction, said clamp, when rendered active, being independent of parts other than those carried by said support for performing its clamping operation.

32. In a machine of the class described, the combination of a meat cutter and a relatively movable meat support, a self-contained meat clamp carried by the support, means whereby the movement of the support will render the clamp active and inactive, and means for moving the meat upon the support when the clamp is inactive.

33. In a machine of the class described, the combination of a relatively movable meat support and meat cutter, a meat holding clamp, means for automatically rendering the clamp active and inactive, and means controlled by the action of the clamp for feeding the meat with respect to the support when the clamp is inactive.

34. In a machine of the class described, the combination of a relatively movable meat support and meat cutter, a meat holding clamp, means for automatically rendering the clamp active and inactive, means connected with the support and movable with respect thereto into and out of engagement with the meat, means whereby the movement of the clamp will control the movement of the last said means, and means for automatically feeding the meat with respect to the support.

35. In a machine of the class described, the combination of a relatively movable meat support and meat cutter, a meat holding clamp, means for automatically rendering the clamp active and inactive, means controlled by the action of the clamp, for feeding the meat with respect to the support automatically when the clamp is inactive, and means whereby the extent of such feeding movement of the meat may be varied.

36. In a machine of the class described, the combination of a relatively movable meat support and meat cutter, a meat holding clamp, means for automatically rendering the clamp active and inactive, and mechanism connected with the clamp and controlled by the action of the clamp for feeding the meat with respect to the support, said mechanism embodying means whereby the extent of such feeding movement of the meat may be varied.

37. In a machine of the class described, the combination of a relatively movable meat support and meat cutter, a meat holding clamp, means for automatically rendering the clamp active and inactive, and mechanism connected with the clamp and controlled by the action of the clamp for feeding the meat with respect to the support, said mechanism embodying a traveling carrier and an adjustable connection between the clamp and carrier, whereby the extent of such feeding movement of the meat may be varied.

38. A reciprocating meat support, a meat clamp carried thereby and means whereby the movement of the support will operate the clamp to render the latter active and inactive, said clamp, when rendered active, being capable of clamping meat on said support independently of parts other than those carried by said support.

39. A reciprocating meat support, a meat clamp carried thereby for clamping the meat, means for rendering said clamp operative and means whereby the movement of the support in one direction will release the meat from the clamp, said clamp, when rendered active, being capable of clamping meat on said support independently of parts other than those carried by said support.

40. A reciprocating meat carriage, a meat clamp carried thereby for clamping the meat, means whereby the movement of the carriage in one direction will release the meat from the clamp, and means for feeding the meat with respect to the clamp and carriage when the meat is thus released.

41. A reciprocating meat carriage, a meat clamp carried thereby for clamping the meat, means whereby the movement of the carriage in one direction will release the meat from the clamp, and means controlled by the action of the clamp for feeding the meat with respect to the clamp and carriage each time the meat is thus released.

42. A reciprocating meat carriage, a meat clamp carried thereby for clamping the meat, means whereby the movement of the carriage in one direction will release the meat from the clamp, means controlled by the action of the clamp for feeding the meat with respect to the clamp and carriage each time the meat is thus released, and means whereby the extent of such feeding movement may be varied at will.

43. A meat supporting carriage, means for feeding the meat with respect to the carriage, a meat clamp adapted to be rendered active and inactive with respect to the meat, and an operative connection between the clamp and feeding means whereby the operation of the former will actuate the latter.

44. A meat supporting carriage, means for feeding the meat with respect to the carriage, a meat clamp adapted to be rendered active and inactive with respect to the meat, and an operative connection between the clamp and feeding means whereby the operation of the former will actuate the latter, said connection embodying means whereby the extent of such feeding movement may be varied.

45. A meat supporting carriage, means for feeding the meat with respect to the carriage, a meat clamp coöperating with the carriage movable into and out of clamping position with relation to the meat, and means controlled by the clamp and adapted to be projected and retracted with respect to the carriage and into and out of engagement with the meat.

46. A meat supporting carriage, means for feeding the meat with respect to the carriage, a meat clamp coöperating with the carriage movable into and out of clamping position with relation to the meat, means controlled by the clamp and adapted to be projected and retracted with respect to the carriage and into and out of engagement with the meat, and an operative connection between the clamp and the said means whereby the latter will be rendered active and inactive respectively when the clamp is rendered active and inactive.

47. A reciprocating meat supporting carriage, means for feeding the meat with respect to the carriage, a meat clamp coöperating with the carriage and movable into and out of clamping position with relation to the meat, means adapted to be projected and retracted with respect to the carriage into and out of engagement with the meat, an operative connection between the clamp and said means whereby the latter will be rendered active and inactive respectively when the clamp is rendered active and inactive, and means for alternately rendering the clamp active and inactive.

48. A reciprocating meat supporting carriage, means for feeding the meat with respect to the carriage, a meat clamp coöperating with the carriage and movable into and out of clamping position with relation to the meat, means adapted to be projected and retracted with respect to the carriage into and out of engagement with the meat, an operative connection between the clamp and said means whereby the latter will be rendered active and inactive respectively when the clamp is rendered active and inactive, and means for alternately rendering the clamp active and inactive, the said connection embodying means whereby the extent of such feeding movement may be varied.

49. A traveling meat supporting carriage, means for feeding the meat with respect to the carriage, a meat holder supported by the carriage and movable with the meat during its feeding movement, and a clamp automatically movable into and out of clamping position with respect to the meat.

50. A meat supporting carriage, means for feeding the meat with respect to the carriage, a meat holder supported by the carriage and movable with the meat during its feeding movement, a clamp movable into and out of clamping position with respect to the meat, means for reciprocating the carriage and means whereby such reciprocating movement will render the clamp active and inactive.

51. A meat supporting carriage, means for feeding the meat with respect to the carriage, a meat holder supported by the carriage and movable with the meat during its feeding movement, a clamp movable into and out of clamping position with respect to the meat, said holder being mounted for free pivotal movement in directions toward and away from the carriage to clamp and release respectively the meat supported by said carriage.

52. In a machine of the class described, the combination of a reciprocating meat supporting carriage, means for reciprocating the carriage, a meat holder carried with the carriage and movable with the meat during its feeding operation, means for intermittently feeding the meat with respect to the carriage, and means controlled by the movement of the holder for rendering the carriage reciprocating mechanism inactive.

53. In a machine of the class described, the combination of a reciprocating meat supporting carriage, means for reciprocating the carriage, a meat holder carried with the carriage and movable with the meat during its feeding operation, means for intermittently feeding the meat with respect to the carriage and means controlled by the movement of the holder for rendering the carriage reciprocating mechanism inactive, said holder being adapted to be set at a predetermined position with respect to the carriage.

54. A machine of the class described, including in combination a meat carriage, means for feeding the meat with respect to the carriage embodying movable carriers, a meat clamp movable into and out of clamping position with respect to the meat, and means connected with the clamp and the carriers for intermittently actuating the latter by the movements of the clamp.

55. A machine of the class described, including in combination a meat carriage, means for feeding the meat with respect to the carriage embodying movable carriers, a meat clamp movable into and out of clamping position with respect to the meat, means connected with the clamp and the carriers for intermittently actuating the latter by the movements of the clamp, the last said means embodying an adjustable connection between the feeding means and the clamp, and a gage coöperating with the connection.

56. A circular knife for meat slicing machines having a concaved and a convexed face terminating in a cutting edge, the concaved surface receding abruptly from the cutting edge whereby only the extreme cutting edge on the concaved side of the knife will engage the meat, a bone cutting saw, and means for clamping the meat and successively presenting it to the cutter and the saw.

57. In a device of the class described, upper and lower rotary knives, one of which is yieldably supported; means for advancing the meat against the knives; and a bone-severing element, against which the meat is advanced, after engagement with the knives.

58. In a device of the class described, upper and lower rotary knives, one of which is yieldably supported; means for advancing the meat against the knives; and a saw against which the meat is advanced, subsequent to its engagement with the knives.

59. In a meat cutting machine, a reciprocating carriage, a pair of rotary knives and a rotary saw adapted to successively engage a joint of meat carried on said carriage, and means for the simultaneous operation of said carriage, said knives and said saw.

60. In a meat-cutting machine, a pair of rotary knives mounted to be separated by the passage of a bone between them, and a rotary saw mounted to engage the bone after it has passed between the knives, a reciprocating carriage adapted to move a joint of meat supported thereon in engagement with said knives and said saw, and means for the simultaneous operation of said knives, said saw and said carriage.

61. In a meat-cutting machine, a reciprocating carriage, a cutting element disposed to sever a joint of meat carried thereon, mechanism on said carriage for advancing said joint, and an appliance adapted to secure a joint on the carriage and to automatically release the same during a determinate period in the movement of the carriage, said advancing mechanism being controlled by said securing appliance.

62. In a meat-cutting machine, a reciprocating carriage, a cutting element disposed to sever a joint of meat carried thereon, mechanism to automatically advance said joint a predetermined distance during a determinate period in the movement of the carriage, and an appliance adapted to secure a joint on the carriage and to automatically release the same during the said period, said advancing mechanism being controlled by said securing appliance.

63. In a machine of the class described, a pair of oppositely disposed meat cutting devices and yielding means adapted to hold such devices in position to operate on opposite sides of a bone in the meat to be cut and to return such devices to their normal position when they have been displaced.

64. In a machine of the class described, a pair of oppositely disposed rotary meat cutting devices and yielding means holding such devices in position and being adapted to return such devices to their normal position when they have been displaced.

65. In a machine of the class described, a pair of oppositely disposed meat cutting devices, and yielding means holding such devices in position to operate on opposite sides of a bone in the meat to be cut and means for feeding meat to said devices.

66. In a machine of the class described, a pair of oppositely disposed meat cutting devices adapted to operate on opposite sides of a bone in the meat to be cut and to be deflected by a bone in the meat and means for returning such devices to their normal position after they have been so deflected.

67. In a machine of the class described, a pair of oppositely disposed meat cutting devices adapted to operate on opposite sides of a bone in the meat to be cut, and to be automatically deflected thereby, and means for presenting the meat to the cutting devices.

68. In a machine of the class described, a pair of meat cutters mounted for free bodily movement toward and away from each other and adapted to be deflected away from each other by a bone in the meat to be cut.

69. In a machine of the class described, a pair of rotary meat cutters mounted for free bodily movement toward and away from each other and adapted to be deflected away from each other by a bone in the meat to be cut and to be automatically moved toward each other after they have passed the bone.

70. In a machine of the class described, a pair of meat cutters mounted for free bodily movement toward and away from each other and adapted to be deflected away from each other by a bone in the meat to be cut, yielding means for moving the cutters toward each other, and means for presenting the meat to the cutters.

In testimony whereof I have signed my name to this specification, in the presence of two subscribing witnesses, on this 24th day of April, A. D. 1912.

ATWOOD M. NEWELL.

Witnesses:
LOUIS S. MALONE,
JOHN H. OVER.